United States Patent
Zhang et al.

(10) Patent No.: US 10,446,182 B1
(45) Date of Patent: Oct. 15, 2019

(54) MEDIA TEMPERATURE MEASUREMENT FOR ADJUSTING THE LIGHT SOURCE IN HEAT-ASSISTED MAGNETIC RECORDING DEVICE

(71) Applicant: Seagate Technology LLC, Cupertino, CA (US)

(72) Inventors: Lihong Zhang, Singapore (SG); Xiong Liu, Singapore (SG); Samuel Swee Chuan Gan, Singapore (SG)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 16/008,760

(22) Filed: Jun. 14, 2018

(51) Int. Cl.
| | |
|---|---|
| *G11B 11/105* | (2006.01) |
| *G11B 5/60* | (2006.01) |
| *G11B 5/48* | (2006.01) |
| *G11B 5/00* | (2006.01) |

(52) U.S. Cl.
CPC .......... *G11B 5/6088* (2013.01); *G11B 5/4866* (2013.01); *G11B 5/6052* (2013.01); *G11B 2005/0021* (2013.01)

(58) Field of Classification Search
None
See application file for complete search history.

(56) References Cited

U.S. PATENT DOCUMENTS

| | | |
|---|---|---|
| 5,836,694 A | 11/1998 | Nguyen |
| 6,234,669 B1 | 5/2001 | Kienitz et al. |
| 6,278,667 B1 * | 8/2001 | Belser ................ G11B 7/126 369/116 |
| 6,540,398 B2 | 4/2003 | Hollander et al. |
| 6,742,927 B2 | 6/2004 | Bellifemine |
| 8,750,081 B1 | 6/2014 | Peng et al. |

(Continued)

FOREIGN PATENT DOCUMENTS

DE          3934640 C1     2/1991

OTHER PUBLICATIONS

U. Sassi, R. Parret, S. Nanot, M. Bruna, S. Borini. D. DeFazio, Z Zhao, E Lidorikis, F. H. L. Koppens, A. C. Ferrari and A. Colli, "Graphene-based mid-infrared room-temperature pyroelectric bolometers with ultrahigh temperature coefficient of resistance," Nature Communications, Jan. 31, 2017, pp. 1-10, www.nature.com/naturecommunications.

*Primary Examiner* — Tan X Dinh
(74) *Attorney, Agent, or Firm* — Hall Estill Attorneys at Law (57) ABSTRACT

Apparatus and method for heat assisted magnetic recording (HAMR). In some embodiments, a write element has a magnetic write coil that writes a magnetic pattern to a recording layer of a data recording surface. A light delivery mechanism imparts heat in the form of electromagnetic energy to the data recording layer during operation of the write element. A radiation detector detects radiation power emitting from the recording layer responsive to the operation of the light delivery mechanism. A control circuit determines a direct temperature of the recording layer responsive to the detected radiation power, and as necessary, adjusts a power input to the light delivery mechanism responsive to the determined temperature. The radiation detector may be an infrared photodetector with a graphene-based detection layer. The photodetector may be disposed between a write pole and a return pole of the write element.

20 Claims, 5 Drawing Sheets

(56) References Cited

U.S. PATENT DOCUMENTS

| | | | |
|---|---|---|---|
| 8,873,353 B1 | 10/2014 | Riddering | |
| 8,891,341 B1 * | 11/2014 | Krichevsky | G11B 5/02 369/13.13 |
| 8,916,825 B1 | 12/2014 | Egerton et al. | |
| 9,074,941 B1 | 7/2015 | Krichevsky et al. | |
| 9,508,368 B2 | 11/2016 | Gage et al. | |
| 9,658,006 B1 * | 5/2017 | Bruns | B64D 45/00 |
| 9,704,529 B1 * | 7/2017 | Lou | G11B 5/314 |
| 9,881,642 B2 * | 1/2018 | Zhang | G11B 19/048 |
| 10,127,930 B1 * | 11/2018 | Chu | G11B 5/02 |
| 2009/0195939 A1 * | 8/2009 | Gurney | G11B 5/374 360/314 |
| 2012/0063033 A1 * | 3/2012 | Gurney | G01R 33/095 360/234.3 |
| 2015/0085632 A1 * | 3/2015 | Kiely | G11B 5/41 369/53.38 |
| 2015/0279430 A1 * | 10/2015 | Trantham | G11B 5/314 369/13.26 |
| 2015/0372159 A1 | 12/2015 | Englund et al. | |
| 2016/0104514 A1 * | 4/2016 | Burnett | G11B 5/6088 369/13.02 |
| 2017/0113934 A1 * | 4/2017 | Kowalewski | C01B 32/184 |
| 2018/0330754 A1 * | 11/2018 | Mendonsa | G11B 5/455 |

* cited by examiner

MEDIA TEMPERATURE MEASUREMENT FOR ADJUSTING THE LIGHT SOURCE IN HEAT-ASSISTED MAGNETIC RECORDING DEVICE

SUMMARY

Various embodiments of the present invention are generally directed to recording data to a data storage medium using heat assisted magnetic recording (HAMR) techniques.

In some embodiments, a write element has a magnetic write coil that writes a magnetic pattern to a recording layer of a data recording surface. A light delivery mechanism imparts heat in the form of electromagnetic energy to the data recording layer during operation of the write element. A radiation detector detects radiation power emitting from the recording layer responsive to the operation of the light delivery mechanism. A control circuit determines a direct temperature of the recording layer responsive to the detected radiation power. The control circuit may adjust a power input to the light delivery mechanism responsive to the determined temperature. In further embodiments, the radiation detector may be an infrared photodetector with a graphene-based detection layer. The photodetector may be disposed between a write pole and a return pole of the write element.

These and other features and advantages of various embodiments can be understood with a review of the following detailed description in conjunction with the accompanying drawings.

DETAILED DESCRIPTION

Various embodiments of the present disclosure are generally directed to monitoring a temperature of media subjected to a head assisted magnetic recording (HAMR) operation.

Some types of data storage devices use rotatable recording media to store and retrieve user data. Hard disc drives (HDDs) and hybrid drives use a stack of magnetic recording discs that store data in the form of magnetically detectable patterns. Each disc has one or more recording layers adapted to store the data using a corresponding data transducer. The transducers are radially moveable elements that are controllably positioned across the layers to access the data from tracks defined in the recording layer. The transducers include write elements to write data to the associated layers, and read elements which are used to subsequently read back the previously written data.

The write elements include a magnetic coil which applies a magnetic field of selected polarity and duration to magnetize the associated recording layer with a desired magnetic pattern. Some magnetic write systems use HAMR (heat assisted magnetic recording) where a light emitting diode (LED or laser diode) or other source imparts electromagnetic energy to heat the media in the vicinity of the magnetic field. A near field transducer (NFT) may be used to direct the energy from the laser diode onto the media.

The directed energy raises the temperature of the media to a temperature near or above the Curie temperature of the material. This lowers the magnetic coercivity of the recording layer by a sufficient amount to allow the field strength of the magnetic field to set the magnetization to a desired state. As the media cools, the coercivity returns to the original high level and the written magnetized state is "locked" in place until that location of the media is once again heated during a subsequent write operation.

It is generally desirable to perform HAMR write operations using precisely controlled temperature profiles. If higher than specified temperatures are applied during a HAMR write operation, there is a possibility that damage may be incurred by the media and/or by the head. For example, higher than expected temperatures can shorten the operational lives of the laser diode and NFT, can thermally degrade the media, head coatings and materials, etc. Also, writing data at higher than expected temperatures may cause the written locations to remain magnetically pliable longer than expected, since the locations may not cool down at the specified rate. This may allow the written bits to be disturbed by subsequently written bits, introducing bit errors into the written data.

On the other hand, it will be appreciated that if a HAMR writing operation takes place at temperatures that are lower than the specified temperature range, the coercivity of the media may not be lowered sufficiently to enable the field strength of the applied magnetic field to reliably write the data to the media.

It follows that HAMR write operations require an accurate assessment of the media temperature in order to obtain reliable data writes. Media hotspots, or areas of significantly higher temperature as compared to other locations on the disc surfaces, can arise based on a variety of factors including position within the disc stack, dwell time based on previous writes, laser diode power settings, laser frequency/amplitude, media surface reflection, heat dissipation characteristics, etc.

Existing HAMR systems tend to use indirect methods to estimate media temperatures, and thus, are poorly suited to detecting media hotspots and other localized variations in media temperature. Existing techniques for indirectly monitoring media temperatures include the use of a photodetector (PD) to monitor the laser output level, use of a thermal-resistive (DECTR) sensor near the NFT to measure NFT temperature, monitoring the voltage across the laser diode, measuring head protrusion distances, etc.

Regardless of form, each of these and other prior art methodologies tend to provide indirect media temperature measurements in that the techniques estimate the media temperature at a certain location as a function of some other temperature or physical measurement that is taken from a non-media element. Based on empirical analysis, a correlation relationship can be established between the measured parameter of the non-media element (e.g., the NFT, the laser diode, etc.) and the temperature of the media. This can be used to generate a scaling factor that can be applied to provide a reasonably accurate estimation of average media temperature.

A problem with this approach is that these and other techniques do not provide the required accuracy and resolution to detect media hotspots or other localized high frequency variations in media temperature. With continued efforts to miniaturize device geometries and clearances and to reduce activated spot sizes, these and other indirect temperature measurement approaches will continue to fail to detect media hotspots and other localized temperature variations with the required granularity to support reliable high density HAMR based recording.

Various embodiments of the present disclosure provide a method and apparatus for directly measuring media temperatures in a HAMR system. As explained below, some embodiments provide a write element with a magnetic write coil configured to write a magnetic pattern to a recording layer of a data recording medium (media). A heat assisted magnetic recording (HAMR) system is configured to impart heat in the form of electromagnetic energy to the data recording layer during operation of the write element, in order to lower the magnetic coercivity of the recording layer in the vicinity of an applied magnetic field from the coil.

A radiation detector, such as in the form of an infrared photodetector, is configured to detect the amount of radiation power emitted from the recording layer responsive to the operation of the HAMR system. A control circuit is configured to determine a direct temperature of the recording layer responsive to the detected radiation power from the radiation detector, and as necessary, to adjust a power input to the system responsive to the determined temperature in order to bring the media temperature into a desired temperature range.

In some embodiments, the photodetector is used to measure media hotspot temperatures along a given track during a write operation. Radiation power emitted from the track is proportional to the fourth power of temperature per the well-known Stefan-Boltzmann law. Thus, the emitted radiation power is directly measured by the photodetector and converted to a corresponding, direct temperature measurement by the control circuit with a high degree of accuracy. The measured temperature is compared to a specified range of temperatures for a given power level, and as necessary, adjustments are made in the power input to the laser diode and/or other elements in the head to provide closed loop temperature control.

In further embodiments, the photodetector is provided with a sufficiently high response rate to enable real-time adjustments in laser power as data continue to be written to the media. To this end, some embodiments use photodetectors with graphene-based photodetection layers, which can provide the requisite response and have suitably small device profiles.

Figure 1:
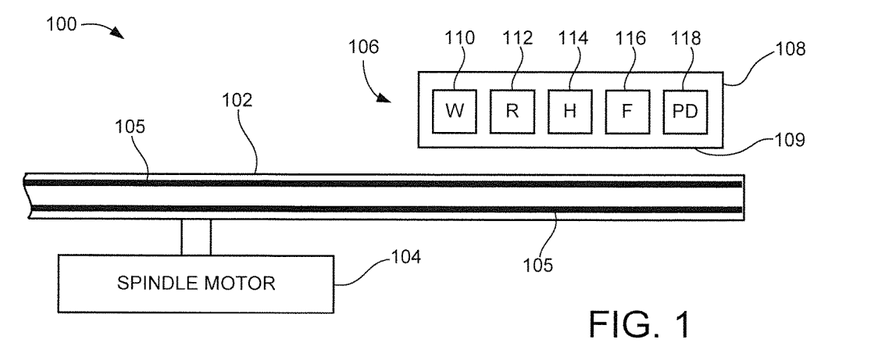
FIG. 1 shows a head/media combination of a data storage device constructed and operated in accordance with some embodiments.

These and other features and advantages of various embodiments will be understood beginning with a review of FIG. 1 which shows aspects of a data storage device 100. The device 100 incorporates rotatable data storage media such as in the case of a hard disc drive (HDD) or a hybrid drive, although other forms of media can be used.

In the example of FIG. 1, one or more data recording media 102 in the form of magnetic recording discs are provided to store user data from a host device. The discs 102 are axially aligned and rotated by a spindle motor 104 at a constant high speed. Each disc has one or more magnetic recording layers 105 configured to magnetically store data.

It is contemplated that the disc 102 has both upper and lower recording layers on the opposing upper and lower sides of the disc as shown, although only the upper layer 105 is of interest in FIG. 1. For ease of discussion, recording layers such as 105 may also be referred to as recording surfaces, and it will be understood that this may not necessarily refer to the outermost physical surface of the associated disc.

A data transducer 106 is controllably positioned adjacent the recording surface 105 of the disc 102. The transducer 106, also referred to as a head, includes a slider 108 with an air bearing surface (ABS) 109 configured to support the slider 108 in close relation to the disc 102 using atmospheric currents established by high speed rotation of the disc.

The slider 108 supports a write element (W) 110 to write data to the recording surface 105 and a read sensor (R) 112 to subsequently read back the previously written data. The write element may take the form of a perpendicular writing coil and the read sensor may be a magneto-resistive (MR) sensor, although other configurations can be used. Other elements can be incorporated into the slider 108, including but not limited to a heat assisted magnetic recording (HAMR) system (H) 114, a fly height adjustment mechanism (F) 116 and a radiation detector in the form of one or more photodetectors (PD) 118.

Figure 2:
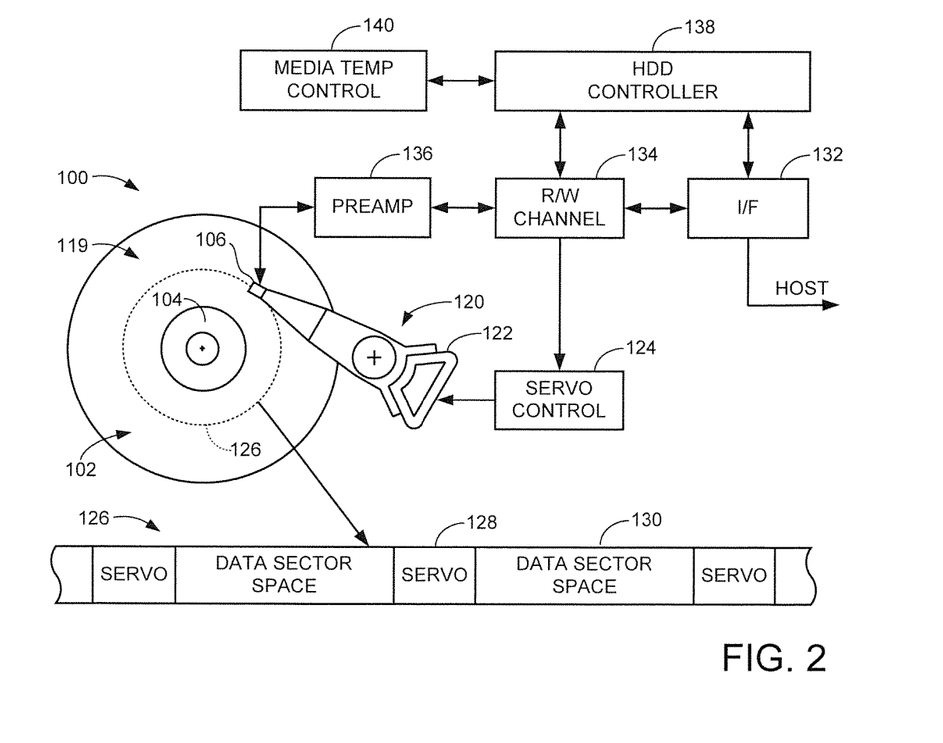
FIG. 2 is a functional block representation of aspects of the data storage device of FIG. 1.

FIG. 2 shows the storage device 100 of FIG. 1 in greater detail. The magnetic recording medium 102 is clamped to and rotated by the spindle motor 104 about a central axis. Multiple discs 102 may be axially mounted in a spaced apart relation to form a disc stack 119, with each disc providing opposing upper and lower recording surfaces. A corresponding transducer 106 is provided for the storage of user data to each surface.

An actuator 120 is disposed adjacent an outermost peripheral edge of the disc 102 to support the transducers 106. The actuator 120 pivots about a pivot point to radially advance the transducers 106 across the respective data recording surfaces 105 through application of current to a voice coil 122 of a voice coil motor (VCM) by a servo control circuit 124. This operation aligns a particular transducer with a corresponding data track on the associated recording surface.

One such data track is denoted at 126. The track 126 is depicted as a concentric track, but other forms of tracks may be used such as spiral tracks, shingled tracks, etc. An embedded servo arrangement is used in which spaced apart servo fields 128 provide servo positioning information to the servo control circuit 124. Data sectors 130 are written along each track 126 in the space between adjacent pairs of the servo fields 128. The data sectors each store a fixed amount of user data, such as 512 bytes (B), 1024B, 4096B, etc.

A data transfer circuit extends between the transducers 106 and the external host device having an interface (I/F) circuit 132, a read/write (R/W) channel 134 and a preamplifier/driver (preamp) circuit 136. The data transfer circuit operates to direct a transfer of user data between the data recording surfaces 105 of the discs 102 and the host device responsive to data access commands issued by the host device.

A top level HDD controller circuit 138 provides top level control of the storage device. The controller 138 incorporates a hardware processing circuit and/or one or more programmable processors that execute program instructions (e.g., firmware) stored in a local memory. A media temperature control circuit 140 operates, as explained below, to monitor and adjust parameters used during data write operations.

Figure 3:
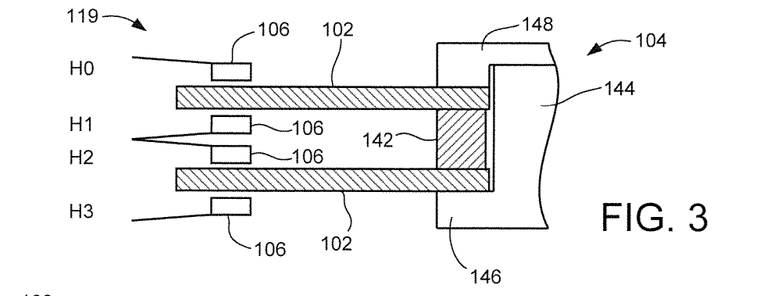
FIG. 3 shows a disc stack and corresponding transducer array of the device of FIG. 2 in some embodiments.

FIG. 3 shows a side elevational depiction of the disc stack 119 from FIG. 2 in some embodiments. In this example, the disc stack has two (2) rotatable discs 102 and four (4) data transducers (heads) 106. The heads are denoted from H0 to H3. Other respective numbers of discs and heads can be used as desired.

An intervening disc spacer 142 establishes an appropriate inter-disc spacing between the discs 102. The spindle motor 104 includes a rotatable disc hub 144 with a radially projecting, annular disc support flange 146. A disc clamp 148 attaches to the top portion of the hub 144 to clamp (compressively retain) the discs to the hub. Head selection circuitry in the preamp 136 (FIG. 2) can be used to individually interconnect a selected one of the heads 106 to the data transfer circuit path and transfer data with an associated recording layer.

Figure 4:
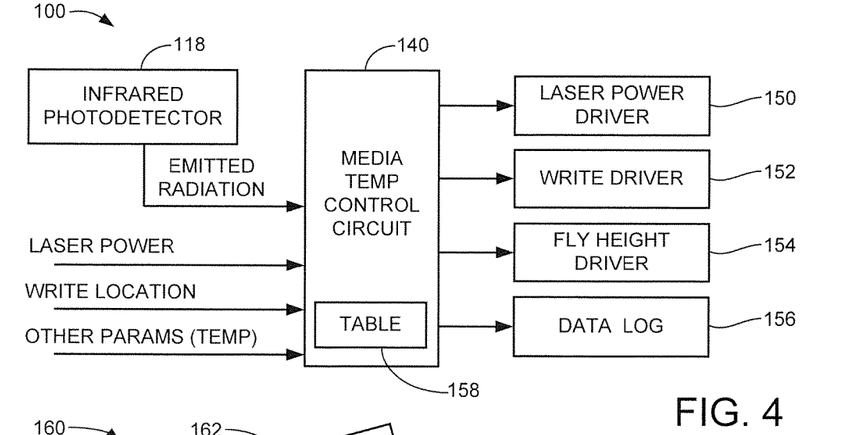
FIG. 4 shows a media temperature control circuit of the data storage device constructed and operated in accordance with some embodiments.

FIG. 4 shows further aspects of the data storage device 100 in some embodiments. The media temperature control circuit 140 from FIG. 2 interfaces with a number of other elements in the system, including the various photodetectors 118 of the heads 106. The circuit 140 can be realized as a hardware circuit and/or one or more programmable processors that execute associated firmware. In some cases, the circuit 140 can be incorporated into the top level controller 138, the servo control circuit 124, or any other suitable location within the device 100.

The circuit 140 receives an emitted radiation power value from the photodetector 118 of the selected head 106. As desired, the circuit 140 can receive additional inputs as well such as a laser power setting for the light source (such as the LED) of the HAMR system 114, a write location address, and other parameters such as a temperature measurement of some other aspect of the system.

The emitted radiation power P is expressed as a sense signal having a magnitude that indicates the detected amount of infrared radiation emitted from the media at a location closely adjacent to, and down-track from, the heat spot from the light source of the HAMR system. The sense signal may be in the form of a voltage that is converted to a multi-bit digital signal by the circuit 140. From this, the circuit 140 determines the direct media temperature T in accordance with the Stefan-Boltzmann law, as follows:

$$P = e\sigma A T^4 \quad (1)$$

where P is the magnitude of the detected emitted power from the photodetector (watts, w), e is a measure of emissivity of the medium (unitless), $\sigma$ is the Stefan-Boltzmann constant $(5.67 \times 10^{-8}$ W m$^{-2}$ K$^{-4})$, A is surface area (in m$^2$) and T is the temperature in degrees Kelvin (° K.).

Once the temperature T of the medium is measured, the control circuit 140 determines whether the temperature is in a suitable range for the current write operation. Should the measured temperature be within accepted tolerances, operation of the system continues at the established parametric settings, while temperature measurements continue to be made to monitor the system.

Should the temperature be too high, adjustments are made by the control circuit 140, such as by decreasing an input power setting value to a laser power driver 150 used to drive the light source. The power setting value is decreased by a suitable interval determined by empirical evaluation or calculation to bring the media temperature back down into the desired range. Measurements continue to be made to confirm an appropriate power setting is being applied, and this power setting is adaptively adjusted as required.

In some cases, adjustments may be additionally or alternatively made to other aspects of the writing system such as by adjusting an input used by a write driver 152 that establishes the magnitude of the write currents supplied by the write element 110, by adjusting a power input supplied by a fly height driver used to supply a fly height adjustment signal to the fly height adjustment mechanism 116, etc.

Temperature measurements and power level adjustments may be accumulated by a data log 156, which can be arranged as a data structure in a suitable memory location to provide history data for calibration and field diagnostics purposes. A conversion table 158 can be another data structure used by the circuit 140 to make appropriate adjustments based on various parametric inputs.

Figure 5:
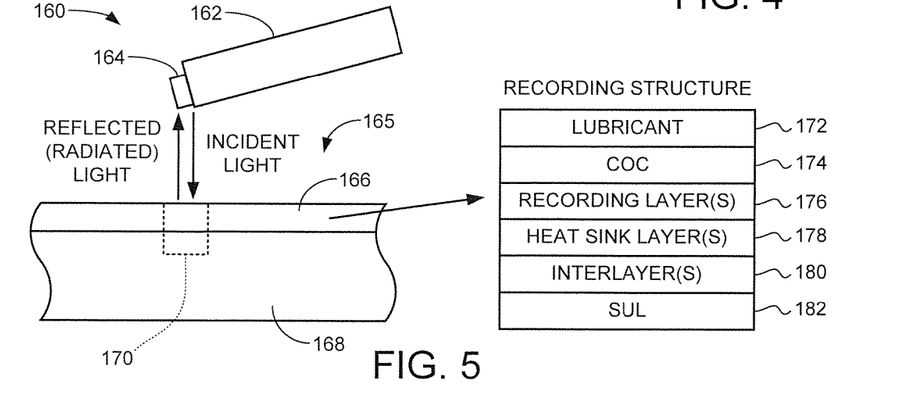
FIG. 5 shows aspects of a selected head-disc interface (HDI) of the data storage device in some embodiments during operation of the circuit of FIG. 4.

FIG. 5 shows a schematic depiction of a head-disc interface (HDI) 160 of the data storage device 100. The HDI 160 represents a selected head and disc surface combination within the device (see e.g., FIGS. 1 and 3). A slider 162 includes a writing system 164 arranged along a trailing edge of the slider. The writing system 164 emits a stream of incident light (electromagnetic radiation) onto a medium 165 having a recording structure 166 supported by a substrate 168. A region 170 is heated by the incident light and emits reflected (radiated) light as shown, which is detected by the photodetector 118 as discussed in FIG. 4.

It will be noted that the incident light and the reflected light may be in the same electromagnetic spectrum (frequency/wavelength), or these respective beams may be in different spectra. For example, an LED may be used to provide collated incident light in the form of a first stream of photons at a first nominal frequency/wavelength in the human visible spectrum, and the reflected light may be a second stream of photons emitted from the medium in the non-human visible infrared spectrum caused by the heating of the medium by the application of the first stream of photons. Any desired wavelengths for both heating and detection, including microwave wavelengths, can be used.

Continuing with FIG. 5, the recording structure 166 can take a variety of forms, such as the example construction shown which has a top layer of lubricant 172 on a protective carbon overcoat (COC) layer 174. These layers serve to protect the medium 165 from damage.

One or more recording layers 176, heat sink layers 178, interlayers 180 and SUL (return) layers 182 form remaining portions of the recording structure. The recording layers 176 are configured with magnetic grains embedded within a non-magnetic boundary to store the written magnetic pattern. The remaining layers 178, 180 and 182 support the recording process such as by retaining heat, providing the recording layers with desired magnetic recording properties, supplying a return path for the magnetic flux applied during writing, etc.

Figure 6:
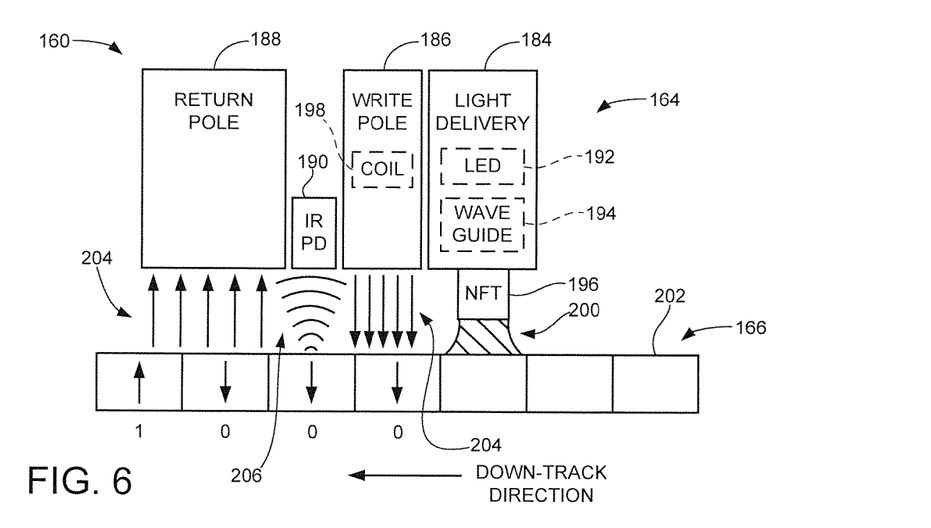
FIG. 6 is a schematic representation of aspects of the HDI from FIG. 5.

FIG. 6 provides a schematic depiction of aspects of the HDI 160 from FIG. 5 in some embodiments. The writing system 164 includes various elements including a light delivery mechanism 184, a write pole 186, a return pole 188 and an infrared photodetector (IR PD) 190.

The light delivery mechanism 184 forms a portion of the HAMR system discussed above and includes, in this embodiment, a light emitting diode (LED) 192, a waveguide 194 and a near-field transducer (NFT) 196. The LED 192 is also sometimes referred to as a laser diode.

The write pole 186 and return pole 188 form a magnetic circuit for a magnetic (write) coil 198, the magnetic circuit having an interconnecting yoke structure (not separately shown) that physically and magnetically joins the write pole and return pole. A perpendicular writer arrangement is shown, although other forms can be used. The photodetector 190 is similar to the photodetectors discussed above and may be sandwiched in the gap between the write pole 186 and the return pole 188, although other locations and arrangements can be used as desired.

The light delivery mechanism 184 generates and transmits light (e.g., the incident light beam in FIG. 5) from the LED via the waveguide to the NFT, which emits a continuous beam 200 upon successive segments 202 of the recording layer 166. As discussed above, the beam 200 forms a spot of selected area on the medium to raise the localized temperature to a desired level.

The coil 186 surrounds the write pole 186 so that time-varying, bi-directional write currents applied to the coil by the write driver generate magnetic flux 204 that flows from the write pole and through the recording layer segments 202 at sufficient density to magnetize the segments as shown. The flux 204 passes along the SUL layer and emerges to the return pole 188 at a lower density so as to not disturb the previously written magnetization directions, due to the respective sizes of the write and return poles.

The emitted power (reflected light in FIG. 5) is represented at 206, and represents the emission of infrared radiation from the heated segments 202 downstream of the NFT beam 200. The temperature of the medium can be determined from this emitted power level in accordance with equation (1) discussed above. The surface area term A will be a function of spot size, which in turn can be estimated as a precise value as a function of NFT geometry and, as desired, other factors such as then-existing fly height, etc.

It will be noted that with respect to the down-track direction, the position of the photodetector 190 is immediately adjacent the write flux 204 so that the emitted power provides an accurate temperature of the medium during the write. Other placements for the detector can be used so long as the detector is not up-track from the NFT and does not otherwise interfere with the operation of the write pole.

Figure 7:
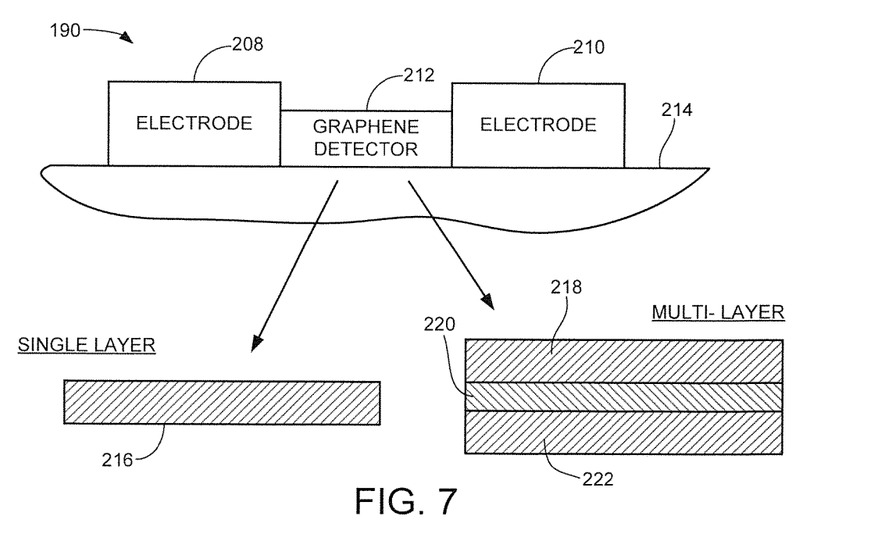
FIG. 7 is a schematic representation of the infrared photodetector (IR PD) element of FIG. 6 in some embodiments.

FIG. 7 shows a schematic representation of an example construction for the photodetector 190 from FIG. 6 in some embodiments. Other constructions can be used. In FIG. 7, the photodetector 190 includes metal electrodes 208, 210 on opposing sides of a graphene-based detector layer 212. Each of these elements is supported on an underlying semiconductor substrate 214. Other elements can be incorporated such as a waveguide (not shown) to enhance collection and direction of radiation from the medium to the detector layer 212.

The detector 190 takes the general form of an n-channel or p-channel MOSFET such that the electrodes 208, 210 form source and drain regions, and the detector layer 212 provides an intervening gate region. A channel is formed under the detector layer 212 within the substrate. The application of photons emitted from the media to the detector layer 212 alters the source-drain conductivity, allowing the radiation power level to be detected in relation to changes of conductivity through the structure.

The detector layer 212 can take a number of forms, including a single layer of material as shown at 216, or a multi-layer construction with layers 218, 220, 222. To provide the required fast response sufficient to enable on-the-fly adjustments of the write beam 200, suitable materials for the various layers may include graphene, alone or in combination with other elements such as germanium, silicon, doped nanoparticles, etc. Other materials may be used, including non-graphene based constructions. The structures can be formed using any number of suitable fabrication processes such as chemical vapor deposition, laser deposition, etc. Generally, using a photodetector that can provide temperature resolution at a rate equal to or greater than the response capabilities of the LED 192 will be sufficient to enable high frequency modulation of the light beam 200 to adaptively compensate for high frequency variations in the media temperature.

Figure 8:
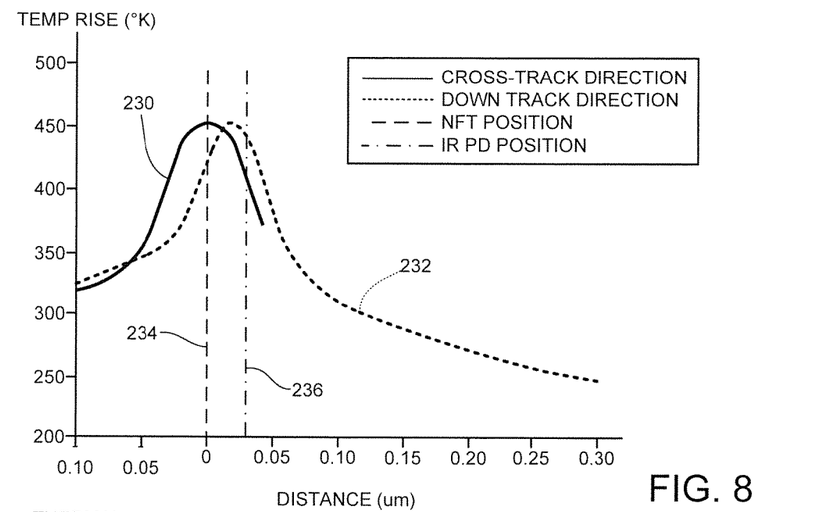
FIG. 8 is a set of temperature response curves for the media of FIG. 6 in some embodiments.
Figure 9:
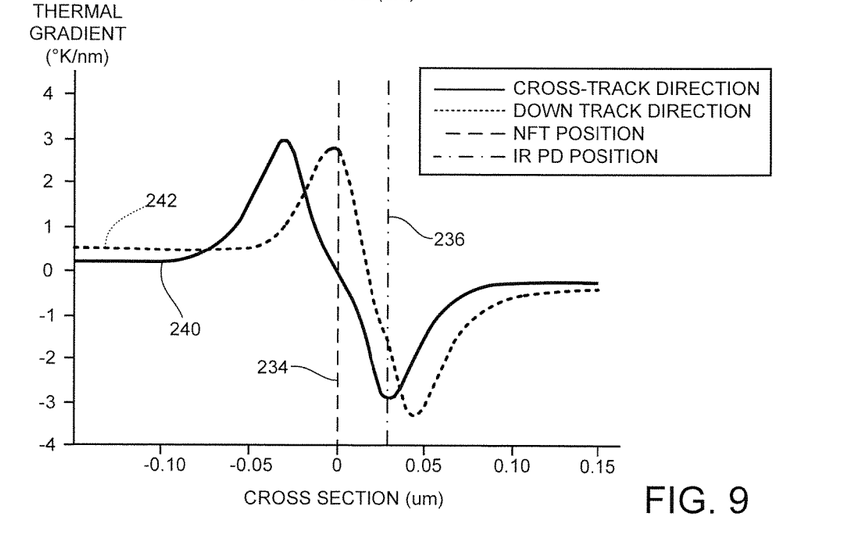
FIG. 9 is a set of temperature gradient curves for the media of FIG. 6 in some embodiments.

FIGS. 8 and 9 show graphical representations of temperature responses that may be experienced by the media using the write system 164 of FIG. 6 in some embodiments. FIG. 8 provides a cross-track temperature response curve 230 to show the temperature response in a cross-track direction and a down-track temperature response curve 232 to show the temperature response in a down-track direction. As will be recognized, the down-track direction is shown in FIG. 6, and the cross-track direction is a radial direction across the track orthogonal to the down-track direction.

The curves 230, 232 are plotted against an x-axis that represents distance along the write system and a y-axis that represents media temperature in ° K. Dotted line 234 represents an alignment (reference 0 point) for the light beam 200 from the NFT 196. Broken line 236 shows a center of the photodetector 190, which is aligned approximately 0.03 um (0.03×10$^{-6}$ m) down-track from the NFT in this example (curve 232). The light spot has an effective width in the cross-track direction of about +/−0.05 um on either side of the NFT (curve 230). FIG. 9 shows a corresponding set of response curves 240, 242 to represent the thermal gradients of the media in the respective cross-track and down track directions.

From curves 230 and 232 it can be seen that the application of the light beam 200 produces a heating profile in which the temperature continues to rise as the associated segment passes under the NFT. The temperature reaches a maximum peak value as the write flux is applied to write data to the segment, after which the temperature begins to taper off.

By placing the photodetector 190 immediately down-track of the write pole 186 as shown in FIG. 6, the effective temperature of the media at the conclusion of the write operation can be determined. It will be noted that the detected temperature in curve 232 at the point where line 236 crosses curve 232 is slightly lower than the peak temperature of the segment during the write. This variation is only a few degrees (see e.g., FIG. 9). Modeling or empirical measurements can be carried out to provide an adjustment factor that can be added to the measured temperature at the photodetector 190 to provide the peak write temperature, if this level of precision is desired.

Because of the symmetric cross-track nature of the light spot as indicated by curve 230, other placement options include placing the photodetector in an offset position to one side of the NFT and measuring the temperature as the segment is heated and/or written. Other options include the use of multiple photodetectors at various locations (e.g. next to the NFT, between the NFT and the write pole, etc.).

It will be appreciated that the respective curves in FIGS. 8-9 show normal temperature response curves within specified ranges, so that no adjustments in power levels would likely be applied under these measured conditions. For these particular curves, a peak write temperature is about 450° K. A suitable range for specified write operations might be nominally this value, +/− some threshold amount (such as 450° K+/−20° K). It is contemplated that if an out of range temperature is detected, the temperature will be higher than expected, necessitating a reduction in the applied LED power (and/or other parameters, such as different fly heights, etc.). The system will work equally as well in detecting media temperatures that are too low, necessitating an increase in laser power and heating to bring to the temperature to the required level to obtain reliable data recording. By continuously monitoring the actual media temperature, accurate and appropriate media temperatures can be maintained as quickly as changes made to the laser settings can induce changes to the media.

Figure 10:
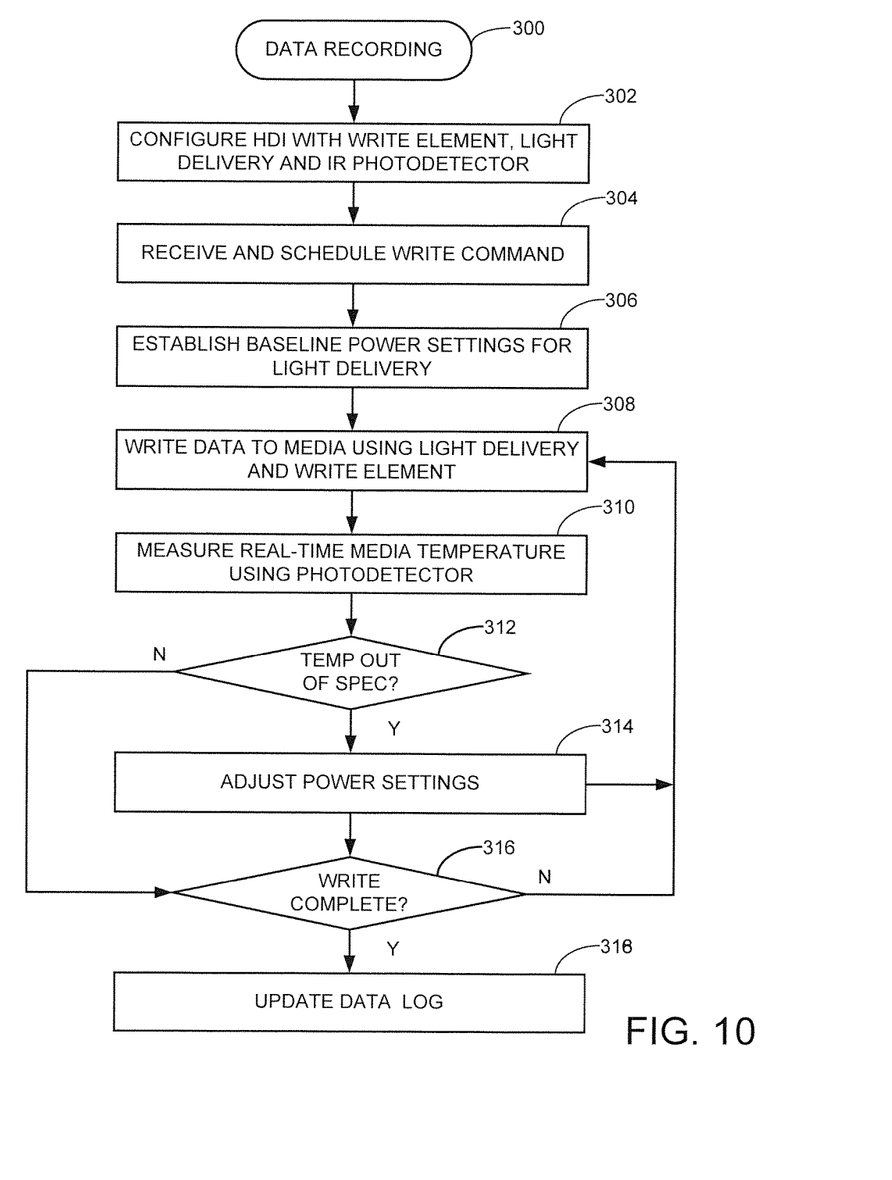
FIG. 10 is a data recording routine carried out by the data storage device in accordance with various embodiments.

FIG. 10 is a flow chart for a data recording routine 300 to summarize various steps carried out in accordance with some embodiments. Other arrangements can be used. Initially, a storage device is provided with a writing system at step 302 having an HDI that includes a write element, a light delivery mechanism and a photodetector, such as illustrated in FIG. 6. A write command is received from a host at step 304, and the command is scheduled for execution. Baseline power settings are established at step 306 by the control circuit 140, and these are applied to commence the writing of the data, step 308.

During the writing of the data, real-time, direct measurements are obtained for the media using the photodetector, step 310. As discussed above in conjunction with FIGS. 4 and 6, radiation power is measured and converted to temperature using equation (1) by the control circuit 140, which further determines, at decision step 312, whether the measured temperature is out of specification.

If so, the control circuit proceeds to adjust one or more power settings of the system, and the process flow continues back to step 308 using the newly established settings. This operation continues with system adjustments as required. It will be appreciated that an extended write operation may include periods of time during which the laser is turned off, such as when the laser passes over the intervening servo fields 128 (see FIG. 2). Accordingly, the closed-loop monitoring of temperature can ensure that the appropriate settings are used to obtain write operations at the desired temperatures for all of the written data.

Decision step 316 shows a determination of the conclusion of the writing operation, at which point the data log from FIG. 4 is updated with information regarding the write operation, including various temperatures and adjustments made, if any.

It will now be appreciated that the various embodiments present a number of benefits over the existing art. Continuous or periodic temperature measurements taken directly from the media using a fast response photodetector enables real-time adjustments to system power parameters to control media temperature. While an IR photodetector is particularly suitable for HAMR style recording, other detection ranges can be used as required. Placement of the photodetector downstream of the light beam and adjacent the magnetization location provides a suitable location to detect the actual temperature of the media during writes. While HAMR systems have been provided, it will be appreciated that this will be construed broadly as any type of recording system that uses energy assisted recording, including but not limited to MAMR (microwave assisted magnetic recording) systems, etc.

It is to be understood that even though numerous characteristics and advantages of various embodiments of the present disclosure have been set forth in the foregoing description, this description is illustrative only, and changes may be made in detail, especially in matters of structure and arrangements of parts within the principles of the present disclosure to the full extent indicated by the broad general meaning of the terms wherein the appended claims are expressed.

What is claimed is:

1. An apparatus comprising:
a write element comprising a magnetic write coil configured to write a magnetic pattern to a recording layer of a data recording surface;
a light delivery mechanism configured to impart heat in the form of electromagnetic energy to the data recording layer during operation of the write element, the electromagnetic energy comprising a stream of collated incident light at a first frequency and wavelength;
a radiation detector configured to detect radiation power emitting from the recording layer responsive to the operation of the light delivery mechanism, the radiation power comprising a stream of reflected light at a different, second frequency and wavelength; and
a control circuit configured to determine a temperature of the recording layer responsive to the detected radiation power and to adjust a power input to the light delivery mechanism responsive to the determined temperature.

2. The apparatus of claim 1, wherein the radiation detector comprises an infrared photodetector adjacent the magnetic write coil.

3. The apparatus of claim 2, wherein the infrared photodetector comprises a detection layer comprising graphene.

4. The apparatus of claim 1, wherein the write element comprises a write pole about which the write coil extends, the write pole directing write flux at a first density toward the data recording surface to write the magnetic pattern to a recording layer of the data recording surface, the write element further comprising a return pole to receive the write flux at a smaller second density in a down-track direction from the write pole, and wherein the radiation detector is disposed between the write pole and the return pole in the down-track direction.

5. The apparatus of claim 1, wherein the light delivery mechanism comprises a light emitting diode (LED), a waveguide and a near-field transducer (NFT).

6. The apparatus of claim 1, wherein the control circuit determines the temperature of the recording layer as a fourth power of the detected radiation power.

7. The apparatus of claim 1, wherein the control circuit compares the temperature to a predetermined specified temperature range, decreases an input to a driver circuit that drives a light source to reduce a level of power output by the light source responsive to the temperature being higher than the specified temperature range, and increases an input to the driver circuit to increase a level of power output by the light source responsive to the temperature being lower than the specified temperature range.

8. The apparatus of claim 1, characterized as a head-disc interface (HDI) in a data storage device that uses heat assisted magnetic recording (HAMR) to record data to a rotatable magnetic recording disc.

9. The apparatus of claim 1, wherein the control circuit is further configured to adjust a power input to at least a selected one of the write coil or a fly height adjustment mechanism responsive to the determined temperature.

10. A data storage device comprising:
a magnetic data recording medium configured for rotation about a central axis at a selected rotational rate;
a data transducer configured to be advanced to different radial locations of a data recording surface of the magnetic data recording medium, the data transducer comprising a write element configured to write a magnetic pattern to the data recording surface, a heat assisted magnetic recording (HAMR) system configured to impart heat in the form of electromagnetic energy to the data recording layer during operation of the write element, and a radiation detector configured to detect radiation power emitted from the recording layer responsive to the operation of the HAMR system, the HAMR system comprising a light emitting diode (LED), a waveguide and a near-field transducer (NFT), the waveguide directing a stream of light from the LED to the NFT for focusing as a light beam upon the data recording surface to raise the temperature of the data recording surface to a level that reaches or exceeds a Curie temperature of the data recording surface, the radiation detector detecting a sequence of photons emitted from the data recording surface adjacent a location at which a magnetic field from the write element establishes the magnetic pattern therein; and a control circuit configured to determine a temperature of the data recording surface adjacent the data transducer responsive to the detected radiation power.

11. The data storage device of claim 10, wherein the control circuit is further configured to adjust a power input to the LED of the HAMR system responsive to the determined temperature of the data recording surface to bring the temperature of the data recording surface within a predetermined temperature range.

12. The data storage device of claim 10, wherein the write element comprises a write pole magnetically coupled to a return pole and a magnetic write coil that surrounds the write pole configured to generate magnetic flux that is directed from an end of the write pole to write the magnetic pattern to the data recording surface responsive to an input sequence of bi-directional write currents, and wherein the radiation detector comprises an infrared photodetector disposed between the write pole and the return pole.

13. The data storage device of claim 10, wherein the electromagnetic energy directed to the data recording layer comprises a stream of collated incident light at a first frequency and wavelength, and wherein the radiation power emitting from the recording layer comprises a stream of reflected light at the first frequency and wavelength.

14. A method comprising:

using a light delivery mechanism to direct incident light upon a data recording layer to increase a temperature of the data recording layer from a base temperature to a peak temperature in relation to a power input supplied to the light delivery mechanism;

directing a magnetic field from a write element to write a magnetic pattern to the data recording layer responsive to the operation of the light delivery mechanism;

detecting, using an infrared photodetector, a level of radiation power emitted from the recording layer adjacent the magnetic field to determine a direct measurement of an instantaneous measurement of the temperature of the data recording layer at or near the peak temperature, the write pole being arranged between the light delivery mechanism and the infrared photodetector in a downtrack direction so that during rotation of the data recording layer each selected location of the data recording layer is sequentially impinged by the incident light, followed by being impinged by the magnetic field, followed by being exposed to the radiation detector; and adjusting the power input to the light delivery mechanism responsive to the instantaneous measurement of the temperature of the data recording layer.

15. The method of claim 14, wherein the detecting step comprises using the infrared photodetector to detect the level of radiation power emitted from each selected location of the recording layer, and using a control circuit that derives the direct measurement of the instantaneous temperature as a fourth power of the level of radiation power detected by the infrared photodetector.

16. The method of claim 14, wherein the light delivery mechanism of the using step comprises a light emitting diode (LED), a waveguide and a near-field transducer (NFT), and wherein the power input to the light delivery mechanism comprises adjusting an input to a LED driver circuit that provides a power input to the LED.

17. The method of claim 14, wherein the write element of the directing step comprises a write pole about which the write coil extends, the write pole directing write flux at a first density toward the data recording layer to write the magnetic pattern, the write element further comprising a return pole magnetically coupled to the write pole to receive the write flux at a smaller second density in a down-track direction from the write pole, and wherein the infrared photodetector is disposed between the write pole and the return pole.

18. The method of claim 14, wherein the incident light from the light delivery mechanism comprises a stream of collated incident light at a first frequency and wavelength, and wherein the radiation power detected by the infrared photodetector comprises radiated light at a different, second frequency and wavelength.

19. The method of claim 14, wherein the incident light from the light delivery mechanism comprises a stream of collated incident light at a first frequency and wavelength, and wherein the radiation power detected by the infrared photodetector comprises radiated light at the first frequency and wavelength.

20. The data storage device of claim 10, wherein the write element is disposed between the HAMR system and the radiation detector in a downtrack direction with respect to the data recording surface so that the radiation detector detects the radiation power after application of the magnetic pattern to the data recording surface.

* * * * *